(12) United States Patent
Bang et al.

(10) Patent No.: US 8,331,451 B2
(45) Date of Patent: Dec. 11, 2012

(54) METHOD AND APPARATUS FOR ENHANCING RESOLUTION OF VIDEO IMAGE

(75) Inventors: Yousun Bang, Seoul (KR); Edward J. Delp, West Lafayette, IN (US); Fengqing Zhu, West Lafayette, IN (US); Ho-young Lee, Suwon-si (KR); Heui-keun Choh, Seoul (KR)

(73) Assignees: Samsung Electronics Co., Ltd., Suwon-Si (KR); Purdue Research Foundation, West Lafayette, IN (US)

( * ) Notice: Subject to any disclaimer, the term of this patent is extended or adjusted under 35 U.S.C. 154(b) by 1514 days.

(21) Appl. No.: 11/826,755

(22) Filed: Jul. 18, 2007

(65) Prior Publication Data

US 2009/0022226 A1    Jan. 22, 2009

(51) Int. Cl.
*H04N 7/12* (2006.01)
(52) U.S. Cl. .................................... 375/240.16
(58) Field of Classification Search .............. 375/240.16, 375/E07.19, 240.12, 240.21, 240.24
See application file for complete search history.

(56) References Cited

U.S. PATENT DOCUMENTS

| | | | |
|---|---|---|---|
| 6,876,703 B2 * | 4/2005 | Ismaeil et al. ........... | 375/240.16 |
| 7,006,704 B2 | 2/2006 | Kobayashi et al. | |
| 7,149,369 B2 | 12/2006 | Atkins | |
| 2006/0115184 A1 | 6/2006 | Michel | |
| 2008/0165848 A1 * | 7/2008 | Ye et al. .................... | 375/240.13 |
| 2009/0285299 A1 * | 11/2009 | Chen et al. ............... | 375/240.16 |

FOREIGN PATENT DOCUMENTS

| | | |
|---|---|---|
| JP | 2006-11999 | 1/2006 |
| KR | 10-2004-0054746 | 6/2004 |
| KR | 10-2004-0054747 | 6/2004 |
| KR | 10-2005-0100321 | 10/2005 |
| KR | 10-2007-0053402 | 5/2007 |

OTHER PUBLICATIONS

Schultz, Richard et al. "Estimatio of subpixel-resolution motion fields from segmented image sequences" In proceedings of SPIE-Sensor Fusion: Architectures, Algorithms, and Applications II (AeroSense '98), vol. 3376, pp. 90-101, Orlando, FL, Apr. 13-17, 1998.*
Korean Office Action dated Feb. 18, 2010 and issued in corresponding Korean Patent Application 10-2007-0086297.

* cited by examiner

*Primary Examiner* — Beemnet Dada
(74) *Attorney, Agent, or Firm* — Staas & Halsey LLP

(57) ABSTRACT

Provided is a technology which can prevent deterioration of image quality when enhancing resolution of a predetermined key frame in a video sequence. Specifically, an apparatus to enhance resolution of a video frame is provided. The apparatus includes a frame extraction unit which extracts a key frame and one or more neighboring frames of the key frame from a video sequence; an upsampling unit which upsamples the key frame and the neighboring frames; a motion-vector search unit which calculates a motion vector of the upsampled key frame using the upsampled neighboring frames as reference frames; and a key-frame estimation unit which enhances quality of the upsampled key frame using temporal information obtained from the motion vector and spatial information in the key frame.

24 Claims, 4 Drawing Sheets

METHOD AND APPARATUS FOR ENHANCING RESOLUTION OF VIDEO IMAGE

BACKGROUND

1. Field

The embodiments discussed herein relate to video image processing, and, more particularly, to a technology that can prevent deterioration of image quality when enhancing the resolution of a predetermined key frame in a video sequence.

2. Description of the Related Art

The development of information and communication technologies (ICT) including the Internet has increased video communication as well as text and voice communications. As conventional text-oriented communication fails to satisfy various needs of consumers, multimedia services, which can provide various types of information such as text, images and music, are increasing. Due to its large size, multimedia data requires mass storage media. In addition, wide bandwidths are required to transmit the multimedia data. Accordingly, a compression coding method is a requisite for transmitting multimedia data including text, images, and audio.

The basic principle of data compression lies in removing data redundancy. That is, image data can be compressed by removing spatial redundancy which has to do with repetition of the same color or object in an image, temporal redundancy which occurs when there is little change between adjacent pictures in a moving image or when the same sound is repeated in audio, or perceptual redundancy which takes into consideration insensitivity of human eyesight and perception of high frequencies.

In a conventional video-coding method, temporal filtering based on motion compensation is used to remove temporal redundancy, and a spatial transform is used to remove spatial redundancy. A video coded using the conventional video coding method is transmitted to a variety of client devices, such as computers, digital televisions, and mobile phones, through a network. The client devices restore original video frames from the coded video in a decoding process corresponding to the coding process.

It is sometimes necessary to upsample the restored video frames (that is, enhance resolution of the restored video frames). For example, if the resolution of the restored video frames is lower than that of a display device that displays the restored video frames or that of a printer that is to print the restored video frames, the upsampling process is essential.

Specifically, if a photo-printer having a resolution of 300 dots per inch (dpi) is to print a video frame having a resolution of 640×480 pixels to a size of 4×6 inches, the resolution of the video frame has to be enhanced nearly three times its original resolution. Similarly, if a laser printer having a resolution of 600 dpi is to print the video frame at the above size, the resolution of the video frame has to be enhanced nearly six times its original resolution.

Generally, a conventional spatial upsampling method, such as bi-linear interpolation or bi-cubic interpolation, is used to upsample still images. On the other hand, video frames are upsampled using their adjacent frames which contain information very similar to the video frames, that is, temporal information. In addition, the upsampled video frames have very limited information compared to the original. Therefore, if the upsampled video frames are not properly upsampled, a resolution of the upsampled video frames deteriorates, and a blocking effect or ringing artifacts is highly likely to occur.

However, most conventional methods of upsampling video frames apply the spatial upsampling method, which is used to upsample still images, and fail to consider improving the upsampling performance using temporal information.

SUMMARY

Additional aspects and/or advantages will be set forth in part in the description which follows and, in part, will be apparent from the description, or may be learned by practice of the invention.

Aspects of the embodiments provide a method and apparatus to upsample video frames using both spatial and temporal information to minimize the deterioration of image quality.

According to an aspect of the embodiments, there is provided an apparatus to enhance the resolution of a video frame (field), the apparatus including a frame (field) extraction unit to extract a key frame (field) and one or more neighboring frames (fields) of the key frame (field) from a video sequence; an upsampling unit to unsample the key frame (field) and the neighboring frames (fields); a motion-vector search unit to calculate a motion vector of the upsampled key frame (field) using the upsampled neighboring frames (fields) as reference frames (fields); and a key-frame (fields) estimation unit to enhance the quality of the upsampled key frame (field) using temporal information obtained from the motion vector and spatial information in the key frame (field).

According to another aspect of the embodiments, there is provided a method of enhancing the resolution of a video frame, the method including extracting a key frame and one or more neighboring frames of the key frame from a video sequence; upsampling the key frame and the neighboring frames; calculating a motion vector of the upsampled key frame using the upsampled neighboring frames as reference frames; and enhancing the quality of the upsampled key frame using temporal information obtained from the motion vector and spatial information in the key frame.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
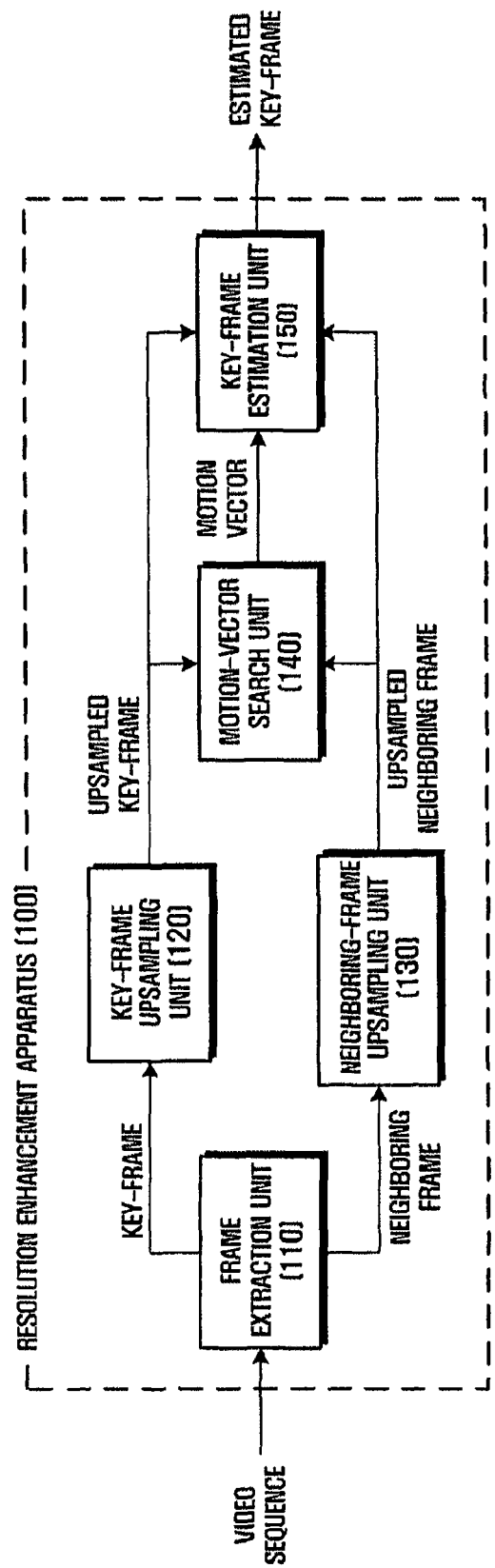
FIG. 1 is a block diagram of a resolution enhancement apparatus according to an exemplary embodiment.

Embodiments will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings indicate like elements, and thus their description will be omitted.

Embodiments will hereinafter be described in detail with reference to the accompanying drawings.

An aspect of the embodiments is a method of enhancing resolution of a key frame from video frames based on information regarding neighboring frames of the key frame and a probability technique to minimize the deterioration of image quality. The term "key frame", as used herein, denotes a frame to be upsampled according to the present invention regardless of whether it is an intra-coded frame or an inter-coded frame.

A conventional upsampling method causes artifacts, such as blurred edges and texture washout, or a blocking effect because it has insufficient constraints for solving the ill-posed inverse problem of enhancement of image resolution.

Therefore, the embodiments formulate the above problem as a constrained optimization problem having a sole solution by using a reproducible approach based on a model that enables enhanced image estimation. In particular, the embodiments use a multiframe-based maximum a posteriori (MAP) estimation technique to enhance the resolution of a key frame included in a video sequence. This technique is based on a Bayesian interpolation method for still images.

Additional constraints on inter-frame information (temporal information) are used to enhance upsampling results and contribute to finding a balance point between calculation complexity and the quality of an upsampled image.

FIG. 1 is a block diagram of a resolution enhancement apparatus 100 according to an exemplary embodiment of the present invention. Referring to FIG. 1, the resolution enhancement apparatus 100 includes a frame extraction unit 110, a key-frame upsampling unit 120, a neighboring-frame upsampling unit 130, a motion-vector search unit 140, and an key-frame estimation unit 150.

The frame extraction unit 110 extracts a frame to be upsampled, that is, a key frame, and one or more neighboring frames of the key frame from a video sequence. The neighboring frames are temporally adjacent to the key frame. In addition, the video sequence may be a group of decoded video frames or an encoded bitstream. If the video sequence is an encoded bitstream, the frame extraction unit 110 has to first restore frames from the encoded bitstream using a predetermined video decoding algorithm.

The key-frame upsampling unit 120 interpolates the extracted key frame using a first interpolation algorithm, and the neighboring-frame upsampling unit 130 interpolates the extracted neighboring frames using a second interpolation algorithm. The first and second interpolation algorithms may be identical or different. Conventional interpolation algorithms, such as bi-linear, bi-cubic, and zero-order-hold interpolation algorithms, may be used as the first and second interpolation algorithms. Using the first and second interpolation algorithms, the key frame and its neighboring frames are upsampled by a predetermined multiple.

The motion-vector search unit 140 searches for a motion vector for the upsampled key frame using the upsampled neighboring frames as reference frames. Generally, block matching is widely used to find a motion vector. Blocking matching is a technology for determining displacement of a pixel block in a search region where the correlation between a key frame and a reference frame is highest.

Figure 2:
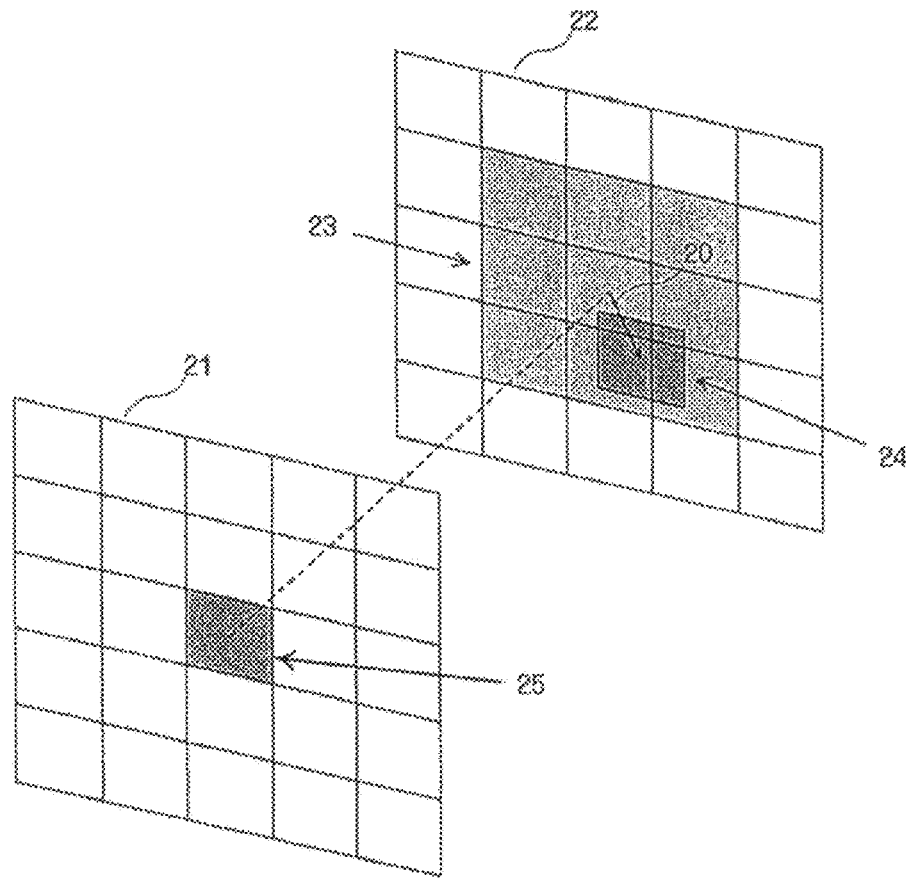
FIG. 2 is a diagram illustrating an example of searching for a motion vector using block matching.

FIG. 2 is a diagram illustrating an example of searching for a motion vector using block matching. Referring to FIG. 2, the motion-vector search unit 140 searches a block 24, which optimally matches a block 25 in a key frame 21, in a search region 23 of a reference frame 22. In this case, displacement 20 between the two blocks 24 and 25 is determined to be a motion vector of the block 25. In addition, optimal matching is based on a minimum mean absolution difference (MAD) between two frames. For example, a MAD function for two nxm blocks A and B is given by Equation (1) below.

$$\frac{1}{mn}\sum_{p=1}^{m}\sum_{q=1}^{n}|A[p,q]-B[p,q]|, \quad (1)$$

where $A[p,q]$ indicates a value of a pixel in a $p^{th}$ row and a $q^{th}$ column of block A, and $B[p,q]$ indicates a value of a pixel in a $p^{th}$ row and a $q^{th}$ column of block B. For better motion estimation, sub-pixel resolution block matching may be used. Half-pixel resolution or quarter-pixel resolution is usually used as the sub-pixel resolution.

The key-frame estimation unit 150 (FIG. 1) receives the key frame upsampled by the key-frame upsampling unit 120, the neighboring frames upsampled by the neighboring-frame upsampling unit 130 and the motion vector found by the motion-vector search unit 140 and estimates an optimally upsampled image for the key frame. In this process, the key-frame estimation unit 150 uses a statistical estimation technique. The estimated, optimally upsampled image is a final output of the resolution enhancement apparatus 100. Through such estimation, the quality of the key frame upsampled by the key-frame upsampling unit 120 is enhanced.

In the present invention, MAP estimation (Bayesian MAP estimation) is used as the statistical estimation technique. The MAP estimation is a probability statistics method that estimates an unobserved value based on experimental data. The MAP estimation method performs optimization based on an assumption about a prior probability distribution and uses a maximum likelihood (ML) normalization technique. In particular, the embodiment suggests a method of finding a sole solution by imposing specified constraints on an ill-posed inverse problem of resolution enhancement of an image.

In MAP estimation, an optimal value is generally a maximum value of a log function of $Pr(z^{(k)}|\{y^{(l)}\})$ which is a conditional probability. If Bayes theorem is applied to the conditional probability, the ill-posed inverse problem becomes an optimization problem as defined by Equation (2). In Equation (2), $\hat{z}^{(k)}$ indicates an optimally upsampled image estimated by the key-frame estimation unit 150.

$$\hat{z}^{(k)} = \underset{z^{(k)}}{\operatorname{argmax}}\left\{\log Pr(z^{(k)}) + \log Pr\left(y^{(k-\frac{M-1}{2})}, \ldots, y^{(k)}, \ldots, y^{(k+\frac{M-1}{2})}\,\middle|\,z^{(k)}\right)\right\}, \quad (2)$$

where M indicates the number of frames used, that is, the number of frames including a key frame and its neighboring frames. In addition, y indicates a frame (a key frame or its neighboring frame) before being upsampled by the key-frame upsampling unit 120 or the neighboring-frame upsampling unit 130, and z indicates a frame (a key frame or its neighboring frame) after being upsampled by the key-frame upsampling unit 120 or the neighboring-frame upsampling unit 130. Furthermore, k indicates a frame number of the key frame. For example, if M=5, four neighboring frames in addition to a key frame are used for MAP estimation. In this case, frame indices (hereinafter, indicated by "l") of the five frames are k−2, k−1, k, k+1 and k+2. Ultimately, for MAP estimation, a prior image model $Pr(z^{(k)})$ and a conditional probability density $Pr(\{y^{(l)}\}|z^{(k)})$ must first be defined, as discussed below.

Figure 3:
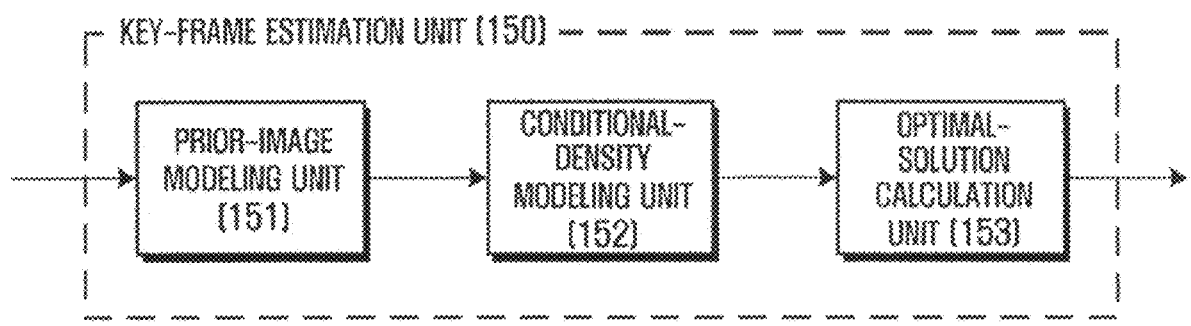
FIG. 3 is a detailed block diagram of the key-frame estimation unit.

FIG. 3 is a detailed block diagram of the key-frame estimation unit 150. Referring to FIG. 3, the key-frame estimation unit 150 includes a prior-image modeling unit 151 modeling the probability distribution of an upsampled key frame, a conditional-density modeling unit 152 modeling the probability distributions of neighboring frames using the upsampled key frame as a constraint, and an optimal-solution calculation unit 153 finding an upsampled key frame which minimizes the sum of the probability distribution of the key frame and those of the neighboring frames.

Specifically, the prior-image modeling unit 151 models a prior image model, that is, a probability $Pr(z^{(k)})$, as a function of a key frame $z^{(k)}$. The conditional-density modeling unit 152 models a conditional density, that is, a probability $Pr(\{y^{(l)}\}|z^{(k)})$ as a function of the key frame $z^{(k)}$, In addition, the optimal-solution calculation unit 153 calculates an optimal solution $\hat{z}^{(k)}$ using an equation which is a combination of the prior image model and the conditional probability density (conditional density).

The operation of the prior-image modeling unit 151 is described in the following. A prior image model may be modeled as a probability density, which is defined by Equation (3), using a Huber-Markov Random Field (HMRF).

$$Pr(z^{(k)}) = \frac{1}{Z}\exp\left\{-\frac{1}{\lambda}\sum_{c\in C}\rho(d_c z^{(k)})\right\}, \quad (3)$$

where Z indicates a constant for normalization, λ indicates a "temperature" parameter of the HMRF, and c indicates a local pixel group in the entire image group C that forms a frame. The kernel of the HMRF image model may be given by Equation (4).

$$\sum_{m=0}^{qN_1-1}\sum_{n=0}^{qN_2-1}\sum_{r=1}^{5}\rho_T(d_{m,n,r}z^{(k)}), \quad (4)$$

where q indicates an upsampling multiple, and $N_1 \times N_2$ indicates the resolution of a frame before being upsampled. In Equation (4), $d_{m,n,r}z^{(k)}$ indicates five local spatio-temporal activities in the entire image group C; the five local spatio-temporal activities are added. In addition, in Equation (4), $\rho_T$ indicates a Huber function defined by Equation (5) below. The Huber function has a convex form.

$$\rho_T(x) = \begin{cases} x^2, & |x| \leq T \\ T^2 + 2T(|x| - T), & |x| > T \end{cases}. \quad (5)$$

The prior-image modeling unit 151 calculates four spatial activities. That is, the prior-image modeling unit 151 calculates quadratic derivatives for pixels placed in vertical, horizontal and two diagonal directions of an upsampled frame. The four spatial activities are given by Equation (6).

$$d_{m,n,1}z^{(k)} = z_{m,n+1}^{(k)} - 2z_{m,n}^{(k)} + z_{m,n-1}^{(k)} \quad (6)$$

$$d_{m,n,2}z^{(k)} = \frac{1}{2}\left(z_{m-1,n+1}^{(k)} - 2z_{m,n}^{(k)} + z_{m+1,n-1}^{(k)}\right)$$

$$d_{m,n,3}z^{(k)} = z_{m-1,n}^{(k)} - 2z_{m,n}^{(k)} + z_{m+1,n}^{(k)}$$

$$d_{m,n,4}z^{(k)} = \frac{1}{2}\left(z_{m-1,n-1}^{(k)} - 2z_{m,n}^{(k)} + z_{m+1,n+1}^{(k)}\right).$$

Figure 4:
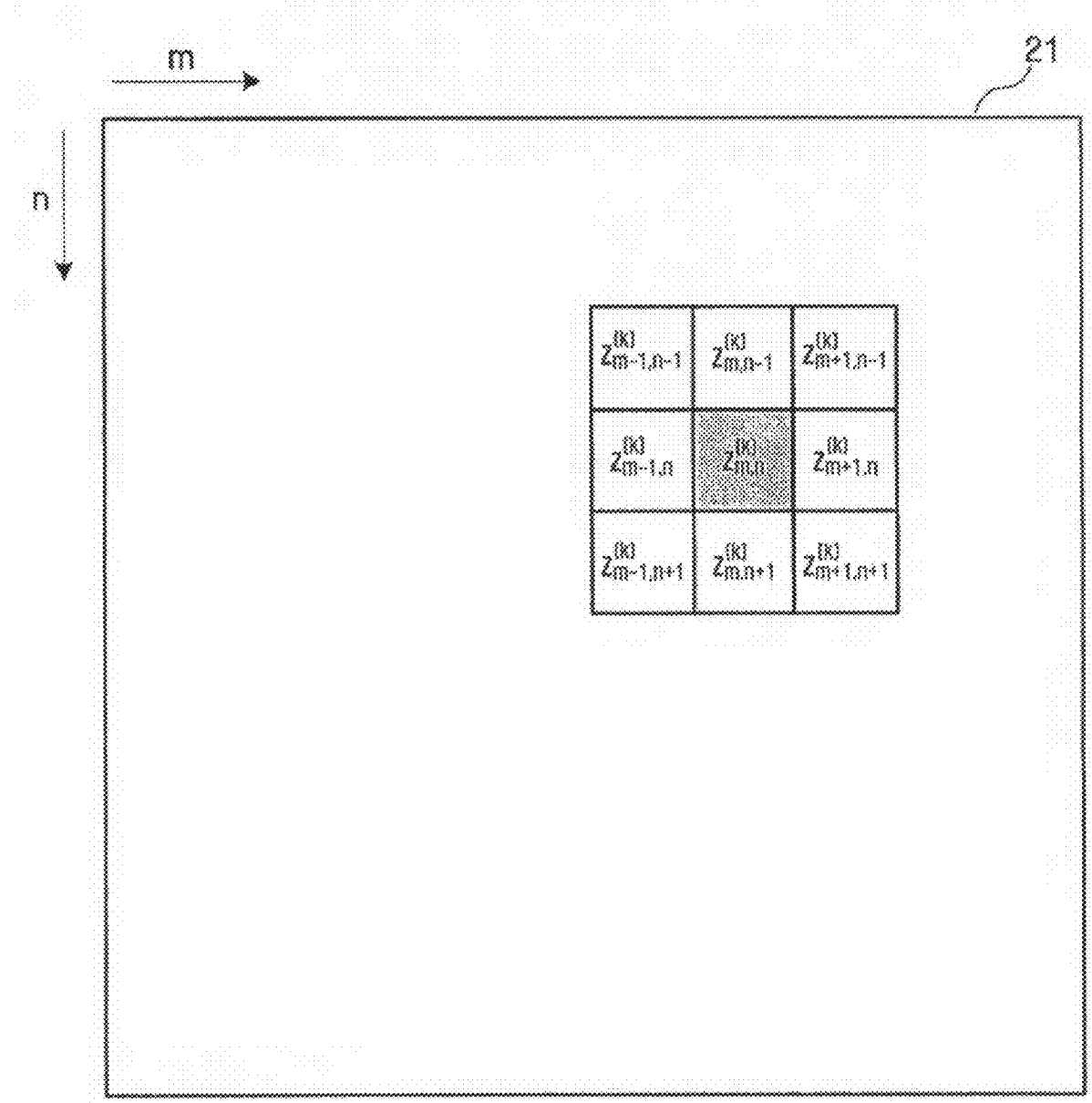
FIG. 4 is a block diagram illustrating pixels related to spatial activities.

Referring to FIG. 4, four spatial activities $d_{m,n,1}z^{(k)}$, $d_{m,n,2}z^{(k)}$, $d_{m,n,3}z^{(k)}$ and $d_{m,n,4}z^{(k)}$ for a pixel $z_{m,n}^{(k)}$ in an upsampled key frame 21 are calculated using two pixels $z_{m,n+1}^{(k)}$ and $z_{m,n-1}^{(k)}$ in a vertical direction, two pixels $z_{m-1,n}^{(k)}$ and $z_{m+1,n}^{(k)}$ in a horizontal direction, two pixels $z_{m-1,n+1}^{(k)}$ and $z_{m+1,n-1}^{(k)}$ in a first diagonal direction, and two pixels $z_{m-1,n-1}^{(k)}$ and $z_{m+1,n+1}^{(k)}$ in a second diagonal direction. In this case, a lower weight, i.e., ½, is assigned to the spatial activities in the two diagonal directions than that assigned to the spatial activity in the vertical or horizontal direction.

The prior-image modeling unit 151 approximates the temporal activity $d_{m,n,5}z^{(k)}$ as a quadratic derivative in a temporal direction as defined by Equation (7) below. The present invention uses temporal activity as a constraint based on the assumption that a frame will become smoother if the temporal activity is minimized.

$$d_{m,n,5}z^{(k)} = z_{m+\delta_1,n+\delta_2}^{(k-1)} - 2z_{m,n}^{(k)} + z_{m+\Delta_1,n+\Delta_2}^{(k+1)}, \quad (7)$$

where a pair of $\delta_1$ and $\delta_2$ indicates a motion vector between a previous frame and a key frame, and a pair of $\Delta_1$ and $\Delta_2$ indicates a motion vector between a next frame and the key frame.

As described above, after the prior-image modeling unit 151 models a prior image, the conditional-density modeling unit 152 models a conditional density function $Pr(y^{(l)}|z^{(k)})$. If a motion-compensated sub-sampling matrix $\hat{A}^{(l,k)}$ has independent and identical Gaussian distributions with a mean of zero, the conditional density function may be modeled by Equation (8).

$$Pr(y^{(l)}|z^{(k)}) = const. \times \exp\left\{-\frac{1}{2\sigma^{(l,k)2}}\left\|y^{(l)} - \hat{A}^{(l,k)}z^{(k)}\right\|^2\right\}. \quad (8)$$

Furthermore, a motion compensation error which smoothes an upsampled key frame can be estimated using Equation (9).

$$\sum_{\substack{l=k-\lfloor\frac{M-1}{2}\rfloor \\ l\neq k}}^{k+\lceil\frac{M-1}{2}\rceil} \lambda^{(l,k)}\left\|z^{(l)} - \hat{B}^{(l,k)}z^{(k)}\right\|^2, \quad (9)$$

where $\hat{B}^{(l,k)}$ indicates a motion compensation matrix between a key frame and its neighboring frame, and $\lambda^{(l,k)}$ indicates a confidence parameter.

Not all motion vectors that form the motion compensation matrix $\hat{B}^{(l,k)}$ can be considered as having been correctly estimated. The compensation error in Equation (9) may be increased due to some incorrectly estimated motion vectors. For example, in the case of a scene change between a key frame and a neighboring frame, a motion compensation error between the motion-compensated neighboring frame and the motion-compensated key frame may increase. Therefore, the conditional-density modeling unit 152 has to calculate a detection-of-frame-difference (DFD) given by Equation (10) and determine reliability of the motion compensation matrix.

$$DFD_{m,n}^{(l,k)} = |z_{m-\delta_1,n-\delta_2}^{(l)} - z_{m,n}^{(k)}| \quad (10).$$

If a DFD value is high, a pixel that does not appear in an upsampled neighboring frame $z^{(l)}$ or a pixel that is incorrectly estimated in an upsampled key frame $z^{(k)}$ is considered as a constraint. Then, the constraint is imposed when a motion compensation error term is calculated using Equation (9).

As described above, if the prior image model $Pr(z^{(k)})$ is modeled as Equation (4) and the conditional density $Pr(y^{(l)}|z^{(k)})$ is modeled as Equation (9), the key frame $\hat{z}^{(k)}$ in Equation (2) may be defined by Equation (11).

$$\hat{z}^{(k)} = \arg\min_{\hat{z}^{(k)} \in Z}\left\{\sum_{m,n}\sum_{r=1}^{5}\rho_T(d_{m,n}z^{(k)}) + \sum_{\substack{l=k-\lfloor\frac{M-1}{2}\rfloor\\l\neq k}}^{k+\lceil\frac{M-1}{2}\rceil}\lambda^{(l,k)}\|z^{(l)} - \hat{B}^{(l,k)}z^{(k)}\|^2\right\}. \quad (11)$$

Unlike Equation (2), Equation (11) is for calculating a minimum value because the values in the exponential functions of Equation (3) and (8), respectively, have negative signs.

Using Equation (11), the optimal-solution calculation unit 153 calculates an upsampled key frame $z^{(k)}$ which minimizes the sum of the prior image model and the conditional density model. As described above, since the Huber function is convex, an entire function (the right side of Equation (11)) for estimating a minimum value is also convex. Accordingly, a single solution that minimizes the entire function can be calculated using a gradient optimization method.

The gradient optimization method is a general method of finding an optimal solution. According to the gradient optimization method, $g_n^{(k)} = \nabla f(z_n^{(k)}, T, \lambda)$ can be calculated using an initial value $z_0^{(k)}$ obtained after a frame $y^{(k)}$ is upsampled. Here, a function f is an objective function for calculating a minimum value, and a constraint may be represented by $d_n^{(k)} = Pg_n^{(k)}$. In addition, $d_n^{(k)}$ Indicates a descent direction, and P indicates a projection. The projection P may be defined by Equation (12).

$$P = \begin{bmatrix} Q & & & 0 \\ & Q & & \\ & & \ddots & \\ 0 & & & Q \end{bmatrix}. \quad (12)$$

In Equation (12), Q indicates a $q^2 \times q^2$ matrix with $$\left(1 - \frac{1}{q^2}\right)$$

n a diagonal direction and $$\left(\frac{1}{q^2}\right)$$

in the remaining directions. The optimal-solution calculation unit 153 finds a minimum value by performing iterations using the projection P. In this case, a step interval $\alpha_n$ may be represented by an equation in the descent direction $d_n^{(k)}$.

$$\alpha_n = \frac{d_n^{(k)t} d_n^{(k)}}{d_n^{(k)t} \nabla^2 f(z_i^{(k)}, T, \lambda) d_n^{(k)}}, \quad (13)$$

where $\nabla^2 f(z_n^{(k)}, T, \lambda)$ indicates a Hessian matrix of an objective function. An upsampled key frame is updated using Equation (14).

$$z_{n+1}^{(k)} = z_n^{(k)} + \alpha_n d_n^{(k)} \quad (14)$$

The optimal-solution calculation unit 153 limits the number of iterations using a predetermined threshold value and thus calculates a convergence value.

Figure 5:
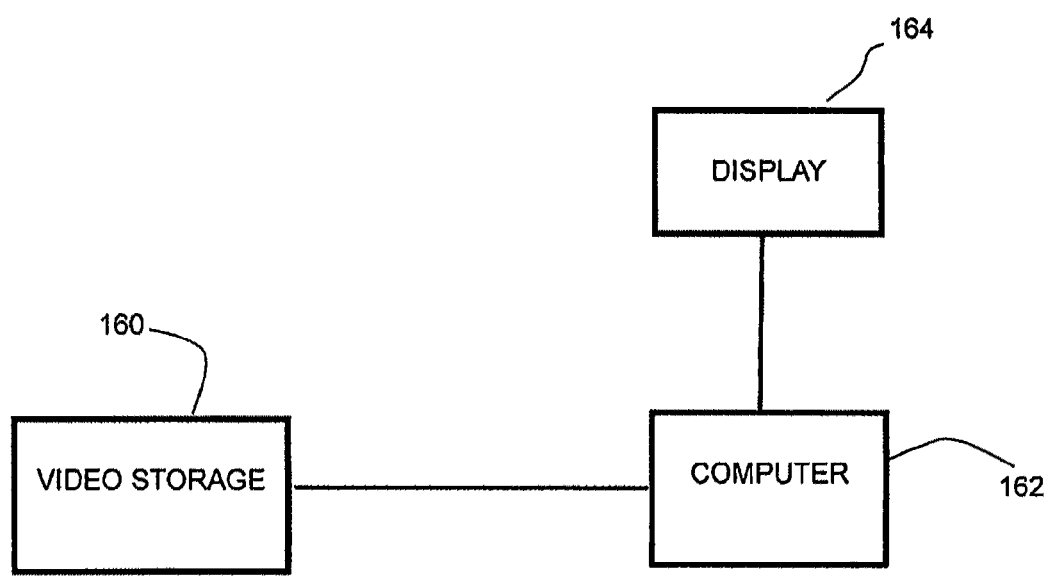
FIG. 5 depicts another exemplary embodiment.

FIG. 5 depicts an embodiment in which a video storage 160 supplies video image data to a computer 162 which performs the operations discussed herein and can share the enhanced key frame for later display or display the enhanced key frame on display 164.

As described above, unlike the conventional upsampling method which upsamples a key frame simply using spatial information, the present invention upsamples the key frame using both spatial and temporal information. Therefore, a clearer high-resolution image with fewer artifacts can be obtained.

Each component described above with reference to FIGS. 1 and 5 may be implemented as a software component performed by a computer, such as a task, a class, a subroutine, a process, an object, an execution thread or a program performed in a predetermined region of a memory, or a hardware component, such as a Field Programmable Gate-Array (FPGA) or an Application-Specific Integrated Circuit (ASIC). In addition, the components may be composed of a combination of software and hardware components. The components may be reside on a computer-readable storage medium or may be distributed over a plurality of computers.

The discussion herein provides information regarding neighboring frames of a video key frame and a probability technique to enhance resolution of the key frame and, at the same time, obtain a clear image. In particular, the present invention can perform Bayesian interpolation on the key frame using Bayesian MAP estimation while enhancing the interpolation result based on information between frames. In addition, the present invention can find an optimal value for image quality of an upsampled frame using calculation complexity as a constraint. Ultimately, since the present invention can minimize deterioration of image quality as compared to conventional interpolation methods, it can be applied in diverse fields such as printers and scalers of display devices.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus to enhance resolution of video image, the apparatus comprising:
    a frame extraction unit to extract a key frame and one or more neighboring frames of the key frame from a video sequence;
    an upsampling unit to upsample the key frame and the neighboring frames;
    a motion-vector search unit to calculate a motion vector of the upsampled key frame using the upsampled neighboring frames as reference frames; and
    a key-frame estimation unit to enhance quality of the upsampled key frame using temporal information obtained from the motion vector and spatial information in the key frame,
    wherein the key-frame estimation unit comprises:
    a prior-image modeling unit to model a prior image model based on the key frame by calculating a plurality of spatial activities of the upsampled key frame and calculating at least one temporal activity of the upsampled key frame based on a motion vector between a previous frame and the key frame, and a motion vector between a next frame and the key frame;

a conditional-density modeling unit to model a conditional density based on the key frame; and an optimal-solution calculation unit to calculate an optimally upsampled key frame using the modeled prior image and the modeled conditional density.

2. The apparatus of claim 1, wherein the neighboring frames comprise one or more frames temporally adjacent to the key frame.

3. The apparatus of claim 1, wherein the key-frame estimation unit applies statistical estimation to the temporal information and the spatial information.

4. The apparatus of claim 3, wherein the statistical estimation is maximum a posteriori (MAP) estimation.

5. An apparatus to enhance resolution of video image, the apparatus comprising:

a frame extraction unit to extract a key frame and one or more neighboring frames of the key frame from a video sequence;

an upsamplinq unit to upsample the key frame and the neighboring frames;

a motion-vector search unit to calculate a motion vector of the upsampled key frame using the upsampled neighboring frames as reference frames; and a key-frame estimation unit to enhance quality of the upsampled key frame using temporal information obtained from the motion vector and spatial information in the key frame, wherein the key-frame estimation unit applies maximum a posteriori (MAP) estimation to the temporal information and the spatial information, and the key-frame estimation unit comprises:

a prior-image modeling unit to model the probability distribution of the upsampled key frame;

a conditional-density modeling unit to model probability distributions of the neighboring frames using the upsampled key frame as a constraint; and an optimal-solution calculation unit to obtain an optimally upsampled key frame that minimizes the sum of the probability distribution of the key frame and those of the neighboring frames.

6. The apparatus of claim 5, wherein the prior-image modeling unit models the probability distribution of the key frame using spatial activities in the key frame and temporal activities between the key frame and the neighboring frames as constraints.

7. The apparatus of claim 5, wherein the conditional-density modeling unit models the probability distributions of the neighboring frames based on motion compensation errors between the key frame and the neighboring frames.

8. The apparatus of claim 5, wherein the optimal-solution calculation unit obtains the optimally upsampled key frame using a gradient optimization method.

9. The apparatus of claim 1, wherein the upsampling unit upsamples the key frame and the neighboring frames using at least one of bi-linear, bi-cubic, and zero-order-hold interpolation methods.

10. The apparatus of claim 1, wherein the motion-vector search unit calculates the motion vector using block matching.

11. A method of enhancing resolution of video image, the method, comprising:

extracting a key frame and one or more neighboring frames of the key frame from a video sequence;

upsampling the key frame and the neighboring frames;

calculating a motion vector of the upsampled key frame using the upsampled neighboring frames as reference frames; and enhancing the quality of the upsampled key frame using temporal information obtained from the motion vector and spatial information in the key frame, wherein enhancing the quality of the upsampled key frame comprises:

modeling a prior image model based on the key frame by calculating a plurality of spatial activities of the upsampled key frame and calculating at least one temporal activity of the upsampled key frame based on a motion vector between a previous frame and the key frame, and a motion vector between a next frame and the key frame;

modeling a conditional density based on the key frame; and calculating an optimally upsampled key frame using the modeled prior image and the modeled conditional density.

12. The method of claim 11, wherein the neighboring frames comprise one or more frames temporally adjacent to the key frame.

13. The method of claim 11, wherein the enhancing quality of the upsampled key frame comprises applying statistical estimation to the temporal information and the spatial information.

14. The method of claim 13, wherein the statistical estimation is MAP (maximum a posteriori) estimation.

15. A method of enhancing resolution of video image, the method, comprising:

extracting a key frame and one or more neighboring frames of the key frame from a video sequence;

upsamplinq the key frame and the neighboring frames;

calculating a motion vector of the upsampled key frame using the upsampled neighboring frames as reference frames; and enhancing the quality of the upsampled key frame using temporal information obtained from the motion vector and spatial information in the key frame, wherein the enhancing quality of the upsampled key frame comprises:

applying MAP (maximum a posteriori) estimation to the temporal information and the spatial information;

modeling probability distribution of the upsampled key frame;

modeling probability distributions of the neighboring frames using the upsampled key frame as a constraint; and obtaining an optimally upsampled key frame which minimizes the sum of the probability distribution of the key frame and those of the neighboring frames.

16. The method of claim 15, wherein the modeling of the probability distribution of the upsampled key frame comprises modeling the probability distribution of the key frame using spatial activities in the key frame and temporal activities between the key frame and the neighboring frames as constraints.

17. The method of claim 15, wherein the modeling of probability distributions of the neighboring frames comprises modeling the probability distributions of the neighboring frames based on motion compensation errors between the key frame and the neighboring frames.

18. The method of claim 15, wherein the obtaining of an optimally upsampled key frame comprises obtaining the optimally upsampled key frame using a gradient optimization method.

19. The method of claim 11, wherein the upsampling of the key frame and the neighboring frames comprises upsampling the key frame and the neighboring frames using at least one of bi-linear, bi-cubic, and zero-order-hold interpolation methods.

20. The method of claim 11, wherein the calculating of a motion vector comprises calculating the motion vector using block matching.

21. A non-transitory computer-readable recording medium for controlling a computer on which a program to execute the method of claim 11 is recorded.

22. A method of enhancing resolution of video image for a computer, comprising:
inputting a video sequence by the computer; and
enhancing a key frame of the video sequences using a multiframe based maximum, by the computer, a posterior estimation technique based on a Bayesian interpolation method used for still images,
wherein enhancing the key frame further comprises:
modeling a prior image model based on the key frame by calculating a plurality of spatial activities of the upsampled key frame and calculating at least one temporal activity of the upsampled key frame based on a motion vector between a previous frame and the key frame, and a motion vector between a next frame and the key frame;
modeling a conditional density based on the key frame; and
calculating an optimally upsampled key frame using the modeled prior image and the modeled conditional density.

23. A method of enhancing resolution of video image for a computer, comprising:
inputting a video sequence by the computer;
extracting a key frame and one or more neighboring frames of the key frame from the video sequence; and
enhancing quality of an upsampled key frame of the sequence using a sequence key frame motion vector from the key frame and the one or more neighboring frames and key frame spatial information from the key frame and the one or more neighboring frames,
wherein enhancing quality of the upsampled key frame further comprises:
modeling a prior image model based on the key frame by calculating a plurality of spatial activities of the upsampled key frame and calculating at least one temporal activity of the upsampled key frame based on a motion vector between a previous frame and the key frame, and a motion vector between a next frame and the key frame;
modeling a conditional density based on the key frame; and
calculating an optimally upsampled key frame using the modeled prior image and the modeled conditional density.

24. An apparatus, comprising:
a computer configured to enhance quality of an upsampled key frame of the sequence using a sequence-key frame motion vector and key frame spatial information; and
a display configured to display the upsampled keyframe,
wherein the computer includes a frame extraction unit to extract a key frame and one or more neighboring frames of the key frame from the video sequence,
and a key-frame estimation unit to enhance the quality of the upsampled key frame, the key-frame estimation unit comprising:
a prior-image modeling unit to model a prior image model based on the key frame by calculating a plurality of spatial activities of the upsampled key frame and calculating at least one temporal activity of the upsampled key frame based on a motion vector between a previous frame and the key frame, and a motion vector between a next frame and the key frame;
a conditional-density modeling unit to model a conditional density based on the key frame; and
an optimal-solution calculation unit to calculate an optimally upsampled key frame using the modeled prior image and the modeled conditional density.

* * * * *

UNITED STATES PATENT AND TRADEMARK OFFICE
CERTIFICATE OF CORRECTION

PATENT NO. : 8,331,451 B2  
APPLICATION NO. : 11/826755  
DATED : December 11, 2012  
INVENTOR(S) : Yousun Bang et al.

Page 1 of 1

It is certified that error appears in the above-identified patent and that said Letters Patent is hereby corrected as shown below:

Title Page, Column 1 (Inventors); Line 2; Delete "Lafeyette," and insert -- Lafayette, --, therefor.

Title Page, Column 2 (Other Publications); Line 1; Delete "Estimatio" and insert -- Estimation --, therefor.

In the Claims

Column 9; Line 23; In Claim 5, delete "upsamplinq" and insert -- upsampling --, therefor.

Column 10; Line 34; In Claim 15, delete "upsamplinq" and insert -- upsampling --, therefor.

Column 12; Line 19; In Claim 24, delete "keyframe," and insert -- key frame, --, therefor.

Signed and Sealed this
Twenty-first Day of May, 2013

Teresa Stanek Rea
*Acting Director of the United States Patent and Trademark Office*